United States Patent [19]
Gvozdjak

[11] 3,805,688
[45] Apr. 23, 1974

[54] ELECTRIC BROILER
[75] Inventor: John Gvozdjak, Lansing, Ill.
[73] Assignee: General Electric Company, Indianapolis, Ind.
[22] Filed: May 16, 1972
[21] Appl. No.: 253,804

[52] U.S. Cl.................................. 99/425, 99/446
[51] Int. Cl....................... A47j 37/06, A47j 37/10
[58] Field of Search............ 99/425, 355, 377, 400, 99/423, 444, 446, 339–340

[56] References Cited
UNITED STATES PATENTS

| | | | |
|---|---|---|---|
| 3,227,067 | 1/1966 | Klemm | 99/446 |
| 3,327,616 | 6/1967 | Ozymy | 99/446 X |
| 3,356,012 | 12/1967 | Rosen | 99/446 |
| 3,455,233 | 7/1969 | Cable | 99/446 X |
| 3,498,211 | 3/1970 | Atkins | 99/446 X |
| 3,601,036 | 8/1971 | Von Kohorn | 99/339 |

Primary Examiner—Harvey C. Hornsby
Assistant Examiner—Arthur O. Henderson

[57] ABSTRACT

An electrically energized char broiler includes a cooking grill having elongated, spaced apart grill elements, each of which includes a recess on its underside. A tubular electric heating element is mounted adjacent to grill with longitudinal runs of the heating element received in the recesses of the grill elements. A shield is received in each recess so that each longitudinal run of the heating element is encased by a grill element and shield. Each shield is held in place in the grill by at least one clip which interfits with the grill. A dished reflecting sheet is positioned below the grill to reflect heat toward the grill and has at least one opening for the passage of grease. A grease guide positioned below the reflector sheet includes a tube for directing grease passing through the reflector sheet to a grease receptacle positioned below the guide.

9 Claims, 3 Drawing Figures

ELECTRIC BROILER

BACKGROUND OF THE INVENTION

This invention relates generally to char broilers or grills and, more particularly, to electrically heated broilers.

A number of efforts have been made to produce an electrically heated grill or char broiler. Such prior art devices designed for commercial use, that is for use in establishments such as restaurants, have had a number of drawbacks. For most economical char broiling of food it is desirable that the electric heating element be adjacent the food supporting grill. However, when such an approach is taken, grease and comdiments such as salt tend to come into contact with the electrical heating element. This can cause the heating element to have an unacceptably short life. Additionally, grease dropping from the grill structure during the cooking operation must be accumulated for later disposal. On occasion individual drops of grease may actually be burning at the time they drop from the grill. It is necessary to adequately cool the grease before it reaches the accumulated body of grease so that the accumulated grease will not become ignited. Also the accumulated body of grease should be suitably shielded from heat radiated by the electrical heating element so that the operation of the heating element will not unnecessarily raise the temperature of the accumulated grease.

SUMMARY OF THE INVENTION

It is accordingly an object of this invention to provide an improved broiler.

It is another object of the present invention to provide an improved electrically heated broiler in which the electrically energized heater is positioned adjacent the food supporting grill structure and, at the same time is shielded from contact by undesirable material.

It is a further object of this invention to provide such an improved broiler in which grease and food particles dropping from the grill structure are adequately cooled prior to contact with other such material which has already been accumulated.

It is yet another object of the present invention to provide such a broiler in which accumulated waste grease and other material is suitably shielded from heat radiated by the electrically energized heater.

The above-mentioned and other features and objects of this invention as well as the manner of attaining them will become more apparent and the invention itself will be better understood by reference to the following description of one embodiment of the invention taken in conjunction with the accompanying drawing, wherein;

DESCRIPTION OF THE PREFERRED EMBODIMENT

Figure 1:
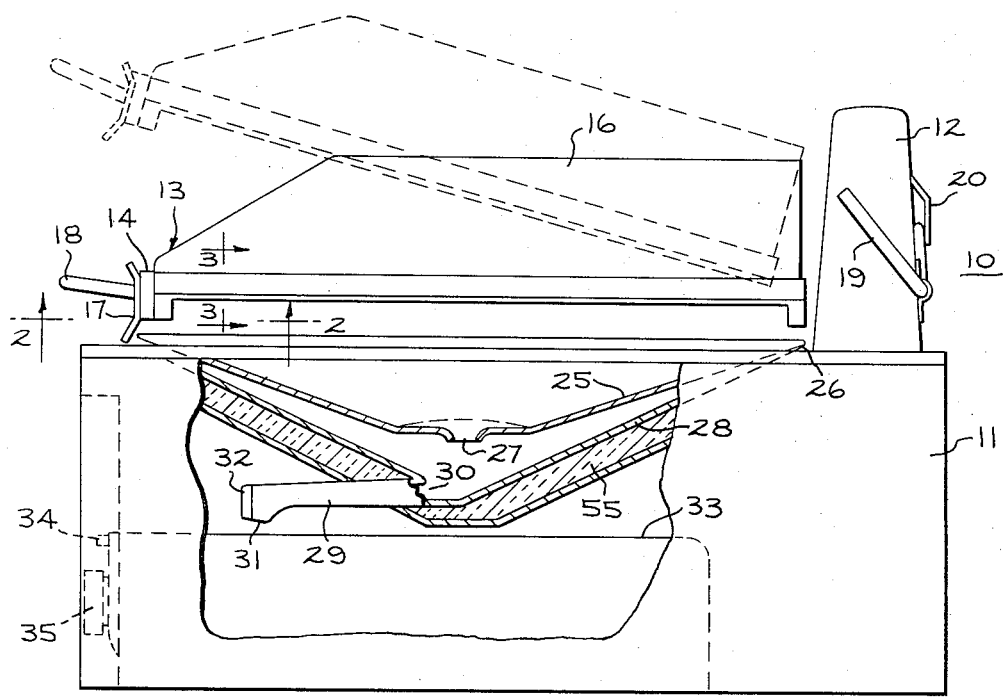
FIG. 1 is a side elevational view of an electrically energized char broiler incorporating one form of the invention, the view being somewhat schematic in form, partially in section and partly cut away for purposes of illustration.

Referring now to the drawing and particularly to FIG. 1 there is shown, in somewhat schematic form, an electric char broiler 10 incorporating one form of the present invention. The broiler 10 includes a generally rectangular housing 11 which conventionally may be constructed from sheet metal. The major portion of the top of the housing is open while at the upper back of the housing there are provided two spaced apart support trunnions, one of which is shown at 12.

A food supporting and cooking grill is generally indicated at 13. The grill assembly conveniently may include two grill sections 14 and 15, a splashguard 16, which extends along the sides and back of the grill sections, a front support 17 and a handle 18. The grill sections are formed from a good heat conducting material and preferably may be made of cast iron or steel. The rear of the grill is pivotally mounted in the two trunnions 12 while the front support 17 is adapted to engage the top front of the sheet metal housing 11. The handle 18 may be used to move the grill between its cooking position (as shown in solid line in FIG. 1) in which the grill sections are essentially horizontal and a raised cleaning position (shown in dotted line in FIG. 1). A locking bar 19 is pivotally mounted to each of the trunnions 12 and is retained against the back of the grill assembly by a keeper 20. When the grill assembly is raised the locking bar releasably retains the grill in its raised position. A more detailed explanation of the construction of and interaction between the locking bar and grill assembly may be had by reference to copending application Ser. No. 253,803 assigned to same assignee as the present invention.

A heat reflector 25 is mounted in the open top of the sheet metal housing 11 and extends downwardly into the housing. Conveniently the heat reflector 25 may be in the form of a downwardly dished sheet having an upper peripheral edge 26 which engages the sheet metal housing adjacent its top opening. The bottom of the reflector is provided with an opening 27 to allow grease and other foreign matter to flow out of the reflector. A grease guide is positioned below the reflector. The grease guide includes a dished sheet 28 that is permanently mounted in the housing and a elongated, generally horizontally extending tube 29. One end of the tube 29 is provided with an opening 30 in communication with the bottom of the dished sheet 28 while the other end of the tube 29 has a downwardly facing opening 31. The end of the tube 29 adjacent the opening 31 is closed by means of a removable cap 32.

A grease storage receptacle in the form of a drawer 33 is slidably mounted in the lower portion of the housing 11 so as to be disposed under the opening 31. The drawer 33 is provided with a handle 34 by which the drawer may be removed from the housing to dispose of accumulated grease and other matter such as food particles and condiments. When the drawer is removed from the housing the cap 32 is accessible through the drawer opening and may be removed to assist in cleaning the tube 29. A number of controls such as the control knob 35 may be mounted from the front portion of the housing 11 and are included in a control circuit for controlling the energization of the heating elements for the grill. One such control circuit is shown and described in the aforementioned copending application and, for the sake of simplicity, will not be described here.

Figure 2:
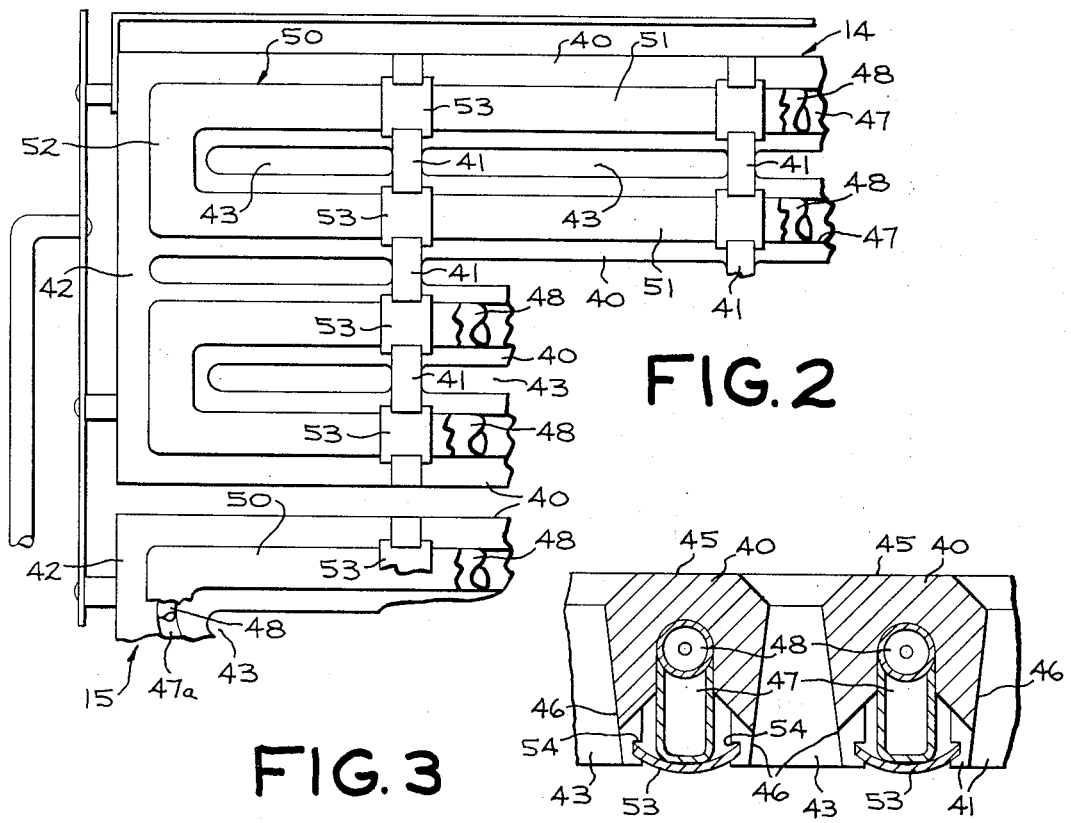
FIG. 2 is a partial bottom plan view of the grill structure and associated elements of the broiler of FIG. 1, generally as seen along the line 2—2 in FIG. 1.
Figure 3:
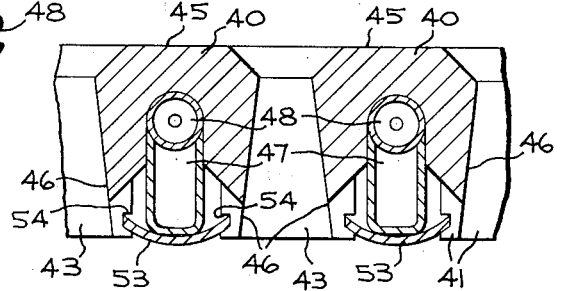
FIG. 3 is a fragmentary cross-sectional view of a portion of the grill structure of the broiler of FIG. 1, generally as seen along line 3—3 in FIG. 1.

Turning now more specifically to FIGS. 2 and 3 it will be seen that each of the grill sections is formed with a number of longitudinally extending grill elements 40 which are joined into an integral structure by cross webbs 41, spaced apart longitudinally of the grill elements, and integral end webbs 42. This provides a number of longitudinally extending openings 43 between adjacent grill elements.

The upper surfaces 45 of the grill elements 40 support food (such as steaks or meat patties for instance) which is to be cooked on the broiler. The openings 43 between the adjacent grill elements provide a means for grease and other matter, such as excess condiments or food particles, to fall between the grill elements. Melted fat or grease will tend to run down the sides of the elements and, to assure that such melted grease drops off of the elements, the lower lateral portions of the individual elements are formed as downwardly facing sharp edges 46. Each of the grill elements 40 is formed with a longitudinally extending, downwardly opening recess 47 along its underside. These recesses 47 are joined at their ends by curved recesses 47a provided in the end webbs 42 so that each grill section is provided with a generally serpentine downwardly opening recess.

Heat for cooking food on the broiler is provided by one or more generally tubular electric heating elements 48 which may be of the sheathed type commonly used in the cooking appliance industry. Any number of individual heating elements 48 may be used; however, for simplicity of wiring and possible replacement there conveniently would be one such heating element for each grill section. The heating elements are formed into a serpentine shape and are received within the downwardly opening recesses 47 and the cooperating end webb recesses 47a. Appropriate conventional connections from the heating elements to the control circuit or power circuit of the broiler are made at the rear of the grill and, for sake of simplicity are not shown.

In order to additionally protect the heating elements 48 from impingement by grease, condiments or other foreign matter one or more shields 50, having a generally U-shaped cross-section, are positioned against the underside of the grill sections with their distal ends extending upwardly into the recesses 47. There can be one shield for each grill section, which is serpentine in configuration so as to overlie substantially the entire heating element 48 for that section. However, suitable protection may be provided by providing separate return bent shields so that each shield 50 will have two longitudinally extending, generally parallel arms 51, each of which is received in one of the longitudinally extending recesses 47. These two arms 51 are joined at the front of the grill by a cross-section 52 which is received in the cross webb recess 47a. With such a configuration the heating element, and particularly its longitudinal runs, is substantially encased by corresponding grill elements and shields. The shields are removably retained within the grill sections by means of clips 53 which are tightly received in a pair of opposed notches 54 provided in the depending arms of a grill element 40. The clips 53 bear against the associated shield 50 so as to firmly hold the shield in position. These notches and associated clips may be spaced longitudinally of the grill elements at any desired positions.

However, the cross webbs are particularly advantageous as they provide locations having additional material and strength.

The construction of the grill sections and the cooperating shields, which substantially encase the heating elements 48 assure that hot grease and other foreign matter such as salt which may be sprinkled on food being prepared will not impinge upon the heating elements. This greatly enhances the life of the heating elements.

It is normal during the life of an electrically heated cooking appliance that a sheathed electrically energized heating element may wear out. With the above described arrangement an individual heating element 48 may be replaced by merely removing the appropriate ones of the clips 43 and shields 50, replacing the burned out element with a new element and then replacing the shields and securing them with the same or new clips.

During cooking operations the grill structure is in its generally horizontally disposed position, as shown in solid lines in FIG. 1; items such as steaks to be broiled are placed on the top surfaces 45 of the grill elements, and the electric heating elements 48 are energized to heat the grill. Some of the heat generated by the electric heating elements will tend to radiate downwardly. The heat reflector 25 reflects this heat back toward the grill with the dished sheet configuration of the reflector assisting in this action by reflecting the heat upwardly and inwardly. Melted fat or grease from the food being cooked will run down the sides of the grill elements 40 and drop off of the lower edges 46. Stray condiments that may be sprinkled on the food and food particles that may drop off of the items being cooked also will fall through the longitudinally extending openings 43 and impinge on the heat reflector 25. The liquid grease and other foreign matter carried by it will flow down the reflector 25 and through the opening 27 onto the dished sheet 28. It then will flow through opening 30 into the tube 29. While the tube 29 is generally horizontal it slopes slightly downwardly toward the opening 31 so that the grease and other matter will flow through the tube 29 and out the opening 31 into the grease receptacle or drawer 33. A large amount of such material can accumulate as the result of many cooking operations before a sufficient body of grease and other matter builds up in the drawer 33 to necessitate removal of the drawer for emptying.

During the cooking process the grill elements 40 may become sufficiently hot that an individual droplet of melted fat may ignite and be burning as it drops through the grill openings 43 onto the heat reflector 25. The elongated path of travel for the grease as well as the lower temperature of the grease guide assures that any burning grease will have an ample opportunity to become extinguished prior to flowing into the grease receptacle. Thus there is no danger of the grease accumulated in the grease receptacle becoming ignited. This action is also enhanced by the fact that the grease guide is substantially shielded from heat radiated from the grill structure by the heat reflector 25 which overlies it.

In order to reduce the temperature level in the lower portion of the housing 11 so as to keep the temperature of the accumulated grease in drawer 33 lower and to reduce the outside temperature of the housing 11 a layer 55 of suitable heat insulation material may be mounted against the underside of dished sheet 28.

While, in accordance with the patent statutes, I have described what, at present, is considered to be the preferred embodiment of my invention it will be obvious to those skilled in the art that various changes and modifications may be made therein without departing from the invention, and it is therefore aimed in the appended claims to cover all equivalent variations as fall within the true spirit and scope of the invention.

What I claim as new and desire to secure by Letters Patent in the United States is:

1. A broiler comprising:
  a. a cooking grill for supporting items to be cooked; said cooking grill including a plurality of elongated, spaced apart grill elements and a plurality of cross webbs joining said grill elements at locations spaced longitudinally along said grill elements, each of said grill elements defining a downwardly opening, longitudinal recess along its underside;
  b. at least one generally tubular electric heating element having a plurality of longitudinal runs; each of said runs being received in a longitudinal recess;
  c. a longitudinal extending shield received in each longitudinal recess so that each longitudinal run of said at least one electric heating element is substantially encased by a corresponding grill element and shield;
  d. reflector means positioned below said cooking grill for reflecting heat toward said grill; said reflector means having at least one opening therein for the passage of grease;
  e. a grease receptacle positioned below said reflector means to receive grease passing through said reflector means; and
  f. a grease guide for directing grease from said reflector means to said grease receptacle; said reflector means substantially shielding said grease guide from heat radiated from said at least one generally tubular electric heating element.

2. A broiler as set forth in claim 1 wherein; said reflector means is in the form of a dished sheet having at least one opening in its lower portion and said grease guide includes an elongated, generally horizontal tube communicating, at one end, with the at least one opening in said dished sheet and, at the other end, with said grease receptacle.

3. A broiler as set forth in claim 1 wherein; said tube is provided at its other end with a cap for directing grease downwardly into said grease drawer; said cap being selectively removable for cleaning of said tube.

4. A broiler as set forth in claim 1, wherein; each of said shields is held in place in said grill by at least one clip which releasably interfits with said grill at a webb location.

5. A electric broiler comprising:
  a. a cooking grill structure having a plurality of elongated, spaced apart grill elements and a plurality of cross webbs joining said grill elements at locations spaced longitudinally along said grill elements;
  b. each of said grill elements defining a longitudinal recess along its underside.
  c. at least one generally tubular electric heating element having a plurality of longitudinal runs; each of said runs being received in a longitudinal recess; and
  d. a longitudinally extending shield received in each longitudinal recess so that each longitudinal run of said at least one electric heating element is substantially encased by a corresponding grill element and shield.

6. A broiler as set forth in claim 5, wherein; each of said shields is held in place in said grill structure by at least one clip which releasably interfits with said grill structure at a webb location.

7. A broiler comprising:
  a. an open top housing;
  b. a grease receptacle removably received in the lower portion of said housing;
  c. a grill structure pivotally mounted adjacent the open top of said housing, said grill structure including a plurality of elongated, spaced apart grill elements;
  d. at least one electric heating element mounted adjacent the underside of said grill structure said at least one heating element including longitudinal runs extending along the underside of corresponding grill elements;
  e. means protecting said at least one electric heating element from contact by matter dropping between said grill elements;
  f. reflector means positioned in said housing below said grill structure for reflecting heat toward said grill structure, said reflecting means having at least one opening therein for the passage of grease;
  g. a grease guide for directing grease from said reflector means to said grease receptacle, said reflector means substantially shielding said grease guide from heat radiated from said at least one electric heating element.

8. A broiler as set forth in claim 7, wherein; said reflector means is in the form of a dished sheet having at least one opening in its lower portion and said grease guide includes an elongated, generally horizontal tube communicating, at one end, with the at least one opening in said dished sheet and, at the other end, with said grease receptacle.

9. A broiler as set forth in claim 7, wherein; each of said grill elements defines a downwardly opening, longitudinal recess along its underside; each of said longitudinal runs of said at least one electric heating element is received in a corresponding longitudinal recess; and a longitudinally extending shield is received in each longitudinal recess so that each longitudinal run is substantially encased by a corresponding grill element and shield.

* * * * *